US010565336B2

(12) United States Patent
Morsey et al.

(10) Patent No.: US 10,565,336 B2
(45) Date of Patent: Feb. 18, 2020

(54) PESSIMISM REDUCTION IN CROSS-TALK NOISE DETERMINATION USED IN INTEGRATED CIRCUIT DESIGN

(71) Applicant: International Business Machines Corporation, Armonk, NY (US)

(72) Inventors: Jason D. Morsey, Hopewell Junction, NY (US); Steven E. Washburn, Poughquag, NY (US); Patrick M. Williams, Salt Point, NY (US); James D. Warnock, Somers, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/988,125

(22) Filed: May 24, 2018

(65) Prior Publication Data
US 2019/0362045 A1 Nov. 28, 2019

(51) Int. Cl.
*G06F 17/50* (2006.01)
*H04B 3/32* (2006.01)

(52) U.S. Cl.
CPC ...... *G06F 17/5036* (2013.01); *G06F 17/5031* (2013.01); *H04B 3/32* (2013.01); *G06F 2217/82* (2013.01); *G06F 2217/84* (2013.01)

(58) Field of Classification Search
CPC ............ G06F 17/5036; G06F 17/5031; G06F 2217/82; G06F 2217/84; H04B 3/32
See application file for complete search history.

(56) References Cited

U.S. PATENT DOCUMENTS

| 6,128,769 A | 10/2000 | Carlson et al. |
| 6,405,348 B1 | 6/2002 | Fallah-Tehrani et al. |
| 6,510,540 B1 * | 1/2003 | Krauter ............... G06F 17/5036 716/115 |
| 6,732,065 B1 | 5/2004 | Muddu |
| 6,836,873 B1 | 12/2004 | Tseng et al. |
| 6,971,076 B2 | 11/2005 | Chen |

(Continued)

OTHER PUBLICATIONS

Gandikota, Ravikishore "Crosstalk Noice Analysis for Nan-Meter VLSI Circuits", Dissertation for Doctor of Philosophy in Electrical Engineering at the University of Michigan, 2009, pp. 1-177.

*Primary Examiner* — Nha T Nguyen
(74) *Attorney, Agent, or Firm* — Cantor Colburn LLP; Erik Johnson

(57) ABSTRACT

A system and method to perform an integrated circuit design involves selecting a net among a plurality of nets of the integrated circuit design as a victim net. Each net connects a pair of nodes of the integrated circuit design and each node represents a logic element of the integrated circuit design. The method also includes determining aggressor nets among the plurality of nets for the victim net and determining a corresponding weight value for each of the aggressor nets and, for each of the aggressor nets, multiplying the coupled noise originating from the aggressor net with the corresponding weight value to obtain a weighted coupled noise value. A cumulative coupled noise value is obtained for the victim net as a sum of the weighted coupled noise values associated with each of the aggressor nets. A result of the integrated circuit design is provided for fabrication into an integrated circuit.

12 Claims, 5 Drawing Sheets

(56) References Cited

U.S. PATENT DOCUMENTS

| | | |
|---|---|---|
| 8,468,479 B2 | 6/2013 | Tehrani et al. |
| 8,701,075 B2 | 4/2014 | Dartu et al. |
| 9,003,342 B1 | 4/2015 | Keller et al. |
| 9,542,524 B2 | 1/2017 | Gregerson et al. |
| 9,660,695 B2 | 5/2017 | Alloin et al. |
| 9,875,748 B2 | 1/2018 | Srinivasan |
| 2006/0112359 A1 | 5/2006 | Becer et al. |
| 2009/0077515 A1 | 3/2009 | Sinha et al. |

\* cited by examiner

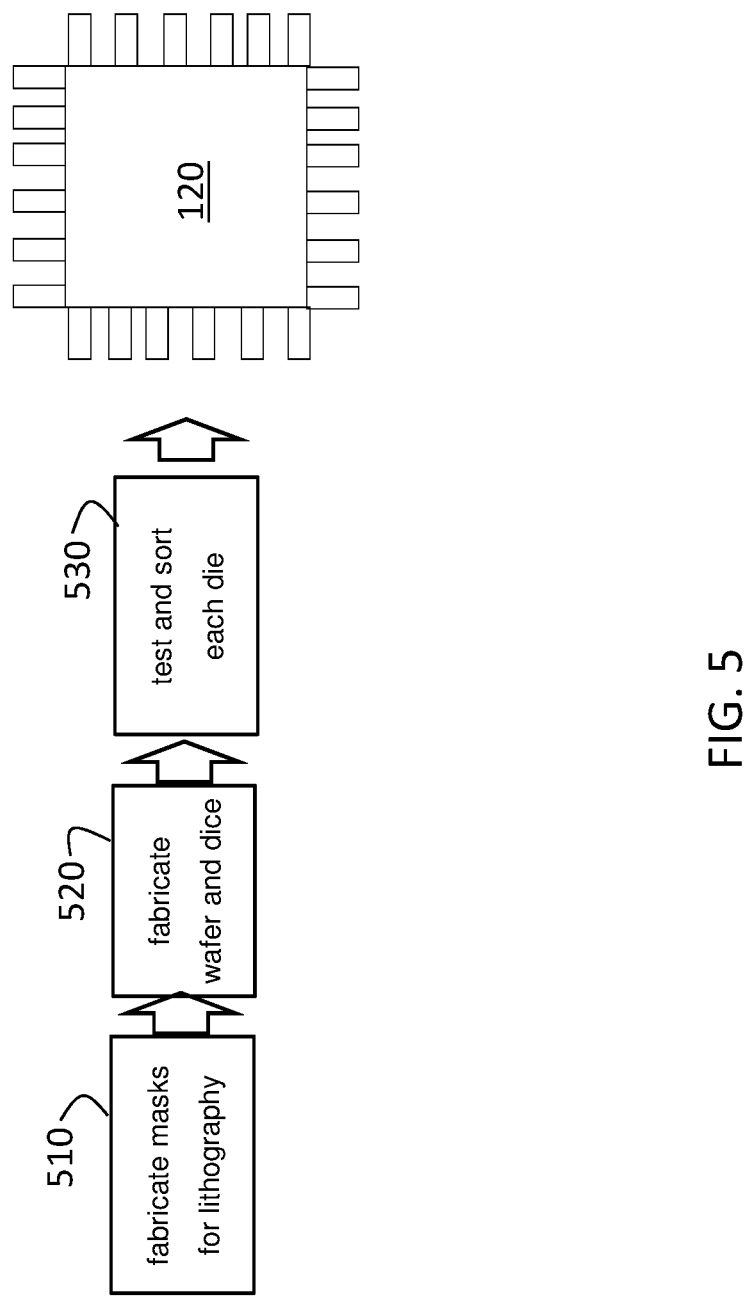

PESSIMISM REDUCTION IN CROSS-TALK NOISE DETERMINATION USED IN INTEGRATED CIRCUIT DESIGN

BACKGROUND

The present invention relates to integrated circuit design, and more specifically, to pessimism reduction in cross-talk noise determination used in integrated circuit design.

The fabrication of an integrated circuit involves a number of stages from a logic design through physical synthesis. During the layout process of the physical synthesis phase, the effect of cross-talk noise (i.e., coupled noise) must be considered. Coupled noise is unwanted energy transferred to a net (i.e., the connection between two or more logic gates or other components, referred to as nodes) from one or more other nets. The affected net can be referred to as a victim net and the nets generating the coupled noise can be referred to as aggressor nets. Coupled noise is typically represented as a voltage signal and can affect timing and functionality of the victim net and corresponding nodes. For example, coupled noise on the victim net can increase charge time (i.e., time to reach a threshold charge that indicates arrival time of a signal) and, consequently, increase the delay at the receiver end of the victim net. As another example, coupled noise over a threshold level can cause a gate connected to the victim net to malfunction. While estimating and addressing coupled noise in the victim net are important to ultimately meeting timing and operational constraints, overestimating coupled noise, referred to as pessimism in the estimate, can lead to unnecessary overdesigning of the integrated circuit.

SUMMARY

Embodiments of the present invention are directed to systems and methods to perform an integrated circuit design involving selecting a net among a plurality of nets of the integrated circuit design as a victim net. Each net connects a pair of nodes of the integrated circuit design and each node represents a logic element of the integrated circuit design. The method also includes determining aggressor nets among the plurality of nets for the victim net, each aggressor net being an origin of a coupled noise that reaches the victim net, and determining a corresponding weight value for each of the aggressor nets and, for each of the aggressor nets, multiplying the coupled noise originating from the aggressor net with the corresponding weight value to obtain a weighted coupled noise value. A cumulative coupled noise value is obtained for the victim net as a sum of the weighted coupled noise values associated with each of the aggressor nets, and a result of the integrated circuit design is provided for fabrication into an integrated circuit

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

FIG. 5 is a process flow of a method of fabricating the integrated circuit designed with pessimism reduction in cross-talk noise determination according to embodiments of the invention.

DETAILED DESCRIPTION

As previously noted, parasitic noise among nets is an issue that must be addressed during the physical synthesis phase of the integrated circuit design to ensure that the physical implementation of the integrated circuit that is ultimately fabricated will meet timing and other operational requirements. The range of time representing when the victim net is susceptible to the influence of coupled noise (e.g., when the receiver of the victim net is charging) can be labelled as the victim sensitivity window. The range of time representing the potential arrival of coupled noise from a given aggressor net can be labelled as an aggressor window. A given victim net may, therefore, have multiple associated aggressor windows.

Related to the need to consider the effect of coupled noise from all the potential aggressor nets is the additional challenge of ensuring that coupled noise is not overestimated (i.e., too pessimistic). One prior approach to pessimism reduction involves limiting the number of aggressor nets that are combined. That is, the N largest aggressor signals are combined and the remainder of the aggressor nets are ignored. Another approach involves categorizing the aggressor nets based on the relative overlap between each of the aggressor windows and the victim sensitivity window and reducing the coupling noise based on category.

Embodiments of the systems and methods detailed herein relate to pessimism reduction in cross-talk noise determination used in integrated circuit design. Specifically, pessimism in the estimation of coupled noise is reduced by using a weighted linear combination of coupled noise from aggressor nets. According to an exemplary embodiment, the weighting on each coupled noise signal is based on the percentage of overlap of the associated aggressor window with the victim sensitivity window. The weighted coupled noise signals are aggregated such that the effect of the cumulative coupled noise is considered in the operation of the victim net, such as in the timing analysis.

Figure 1:
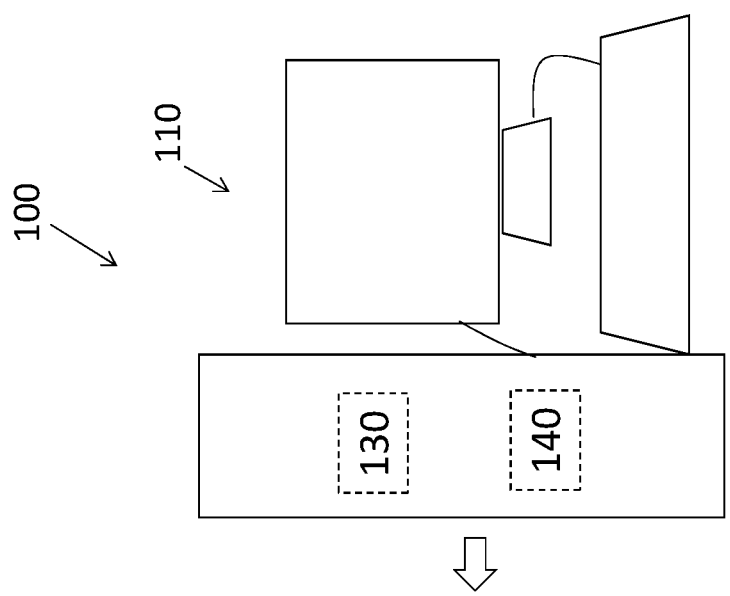
FIG. 1 is a block diagram of a system to perform pessimism reduction in cross-talk noise determination used in integrated circuit design according to embodiments of the invention.
Figure 1:
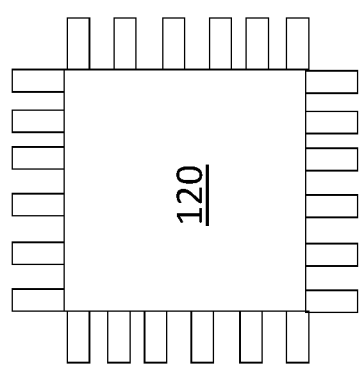

FIG. 1 is a block diagram of a system 100 to perform pessimism reduction in cross-talk noise determination used in integrated circuit design according to embodiments of the invention. The system 100 includes processing circuitry 110 used to generate the design that is ultimately fabricated into an integrated circuit 120. The steps involved in the fabrication of the integrated circuit 120 are well-known and briefly described herein. Once the physical layout is finalized, based, in part, on pessimism reduction in the cross-talk noise determination according to embodiments of the invention, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 5.

The processing circuitry 110 includes one or more memory devices 130 and one or more processors 140. Multiple of the processors 140 may be used in the integrated circuit design and, specifically, the pessimism reduction process detailed herein. The memory device 130 stores instructions implemented by the processor 140. As further discussed, these instructions include processes used to obtain weighted coupled noise signals that are used in the subsequent analysis of the integrated circuit design, as further discussed below.

Figure 2:
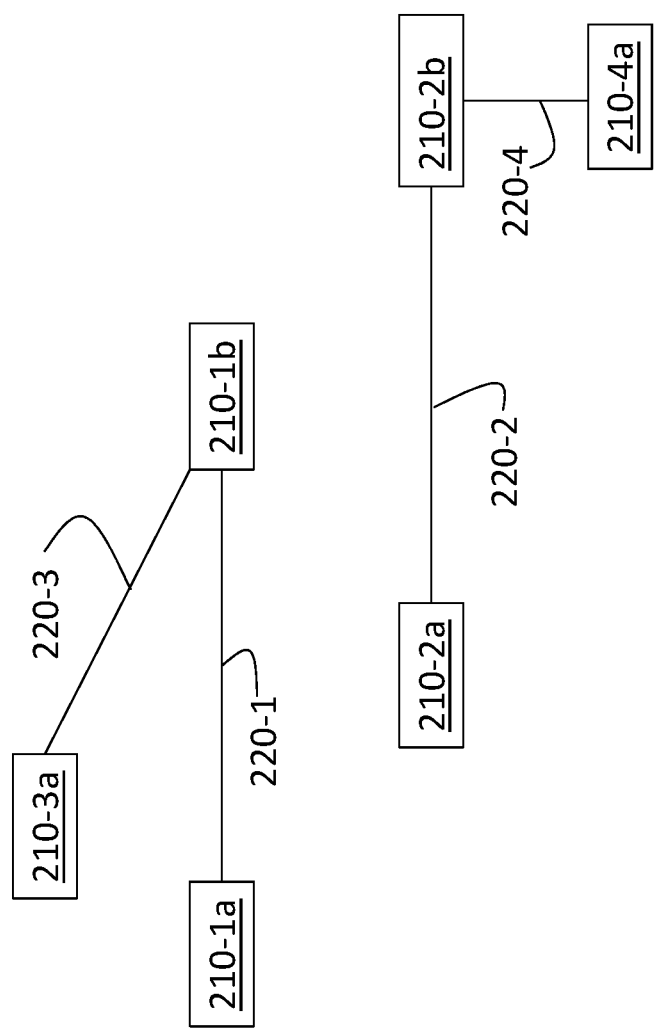
FIG. 2 depicts exemplary nets that are analyzed based on pessimism reduction in cross-talk noise determination according to embodiments of the invention.

FIG. 2 depicts exemplary nets 220 that are analyzed based on pessimism reduction in cross-talk noise determination according to embodiments of the invention. Nodes 210-1a, 210-1b, 210-2a, 210-2b, 210-3a, 210-4a (generally referred to as 210) are shown interconnected by nets 220-1, 220-2, 220-3, 220-4 (generally referred to as 220). As previously noted, the nodes 210 represent logic gates or other components of the integrated circuit 120. The nets 220 represent wires that interconnect the various components. An integrated circuit 120 can include a large number of inputs and outputs. A signal from a given input node 210 traverses a path of nets 220 fanning out from that input node 210 to reach one or more corresponding output nodes 210. As FIG. 2 indicates, nodes 210 along the path originating at a given input node 210 are not necessarily interconnected with nodes 210 along a path fanning from another input node 210. Nets 220-1 and 220-2, for example, may be part of two paths that are not interconnected. However, in analyzing cross-talk noise, the proximity (adjacency, in this case) may mean that each of the nets 220-1, 220-2 must be considered an aggressor in the analysis of the other. The determination of which nets 220 must be considered as aggressors for a given victim net 220 is detailed with reference to FIG. 4.

Figure 3:
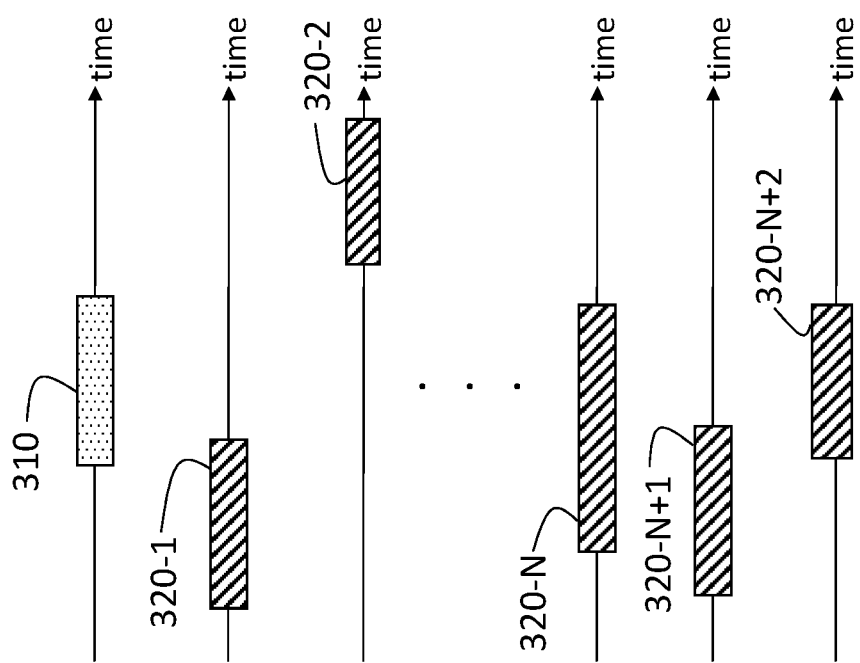
FIG. 3 illustrates an exemplary victim sensitivity window and aggressor windows involved in pessimism reduction in cross-talk noise determination according to one or more embodiments of the invention.

FIG. 3 illustrates an exemplary victim sensitivity window 310 and aggressor windows 320-1 through 320-N+2 (generally referred to as 320) involved in pessimism reduction in cross-talk noise determination according to one or more embodiments of the invention. The victim sensitivity window 310 and aggressor windows 320 are shown on the same time scale to indicate overlaps in their occurrences. As previously noted, the victim sensitivity window 310 indicates the time during which the victim net 220 is susceptible to coupled noise, and each aggressor window 320 indicates the time during which coupled noise from the corresponding aggressor net 220 may potentially arrive at the victim net 220. For example, the victim net 220 is net 220-1 shown in FIG. 2 and the aggressor nets 220 include nets 220-2, 220-3, 220-4.

As FIG. 3 indicates, the different aggressor windows 320 have varying degrees of overlap with the victim sensitivity window 310. For example, aggressor window 320-2 does not overlap with the victim sensitivity window 310 at all, while portions of the aggressor window 320-N overlap with the entire duration of the victim sensitivity window 310, and the entirety of the aggressor window 320-N+2 is within the victim sensitivity window 310. Thus, treating the aggressor net 220 corresponding with aggressor window 320-2 as though it were as likely to interfere with the victim net 220 as the aggressor nets 220 corresponding with aggressor windows 320-N and 320-N+2 would be too pessimistic. This could lead to overdesign of the integrated circuit 120 to address unrealistic issues.

As previously noted, a prior approach to pessimism reduction has involved categorizing the nets 220 (e.g. the aggressor net 220 corresponding with aggressor window 320-2 would be in a different category than the aggressor nets 220 corresponding with aggressor windows 320-N and 320-N+2) and reducing coupled noise estimation based on category. Another prior approach has involved limiting the aggressor nets 220 that are considered in the estimate of coupled noise (e.g., the aggressor net 220 corresponding with aggressor window 320-2 may not be considered at all while the aggressor nets 220 corresponding with aggressor windows 320-N and 320-N+2 are considered).

Embodiments of the invention weight the estimate of coupled noise associated with every aggressor net 220. The weight associated with each aggressor net 220 is based on the percentage of overlap of the associated aggressor window 320 with the victim sensitivity window 310. When an aggressor window 320 does not overlap at all with the victim sensitivity window 310, then the coupled noise from the corresponding aggressor net 220 is weighted 0 percent. For example, in the exemplary scenario shown in FIG. 3, coupled noise from the aggressor net 220 associated with aggressor window 320-2 would be weighted 0 percent, because the aggressor window 320-2 does not overlap with the victim sensitivity window 310 at all. On the other hand, the aggressor net 220 associated with aggressor window 320-N+2 would be weighted 100 percent, because the aggressor window 320-N+2 is entirely within the victim sensitivity window 310. As another example, the aggressor net 220 associated with aggressor window 320-N would be weighted 70 percent, because 70 percent of the aggressor window 320-N overlaps with the victim sensitivity window 310. Coupled noise from the other aggressor nets 220 associated with the other aggressor windows 320 are weighted according to the percentage of those aggressor windows 320 that coincide with the victim sensitivity window 310.

Figure 4:
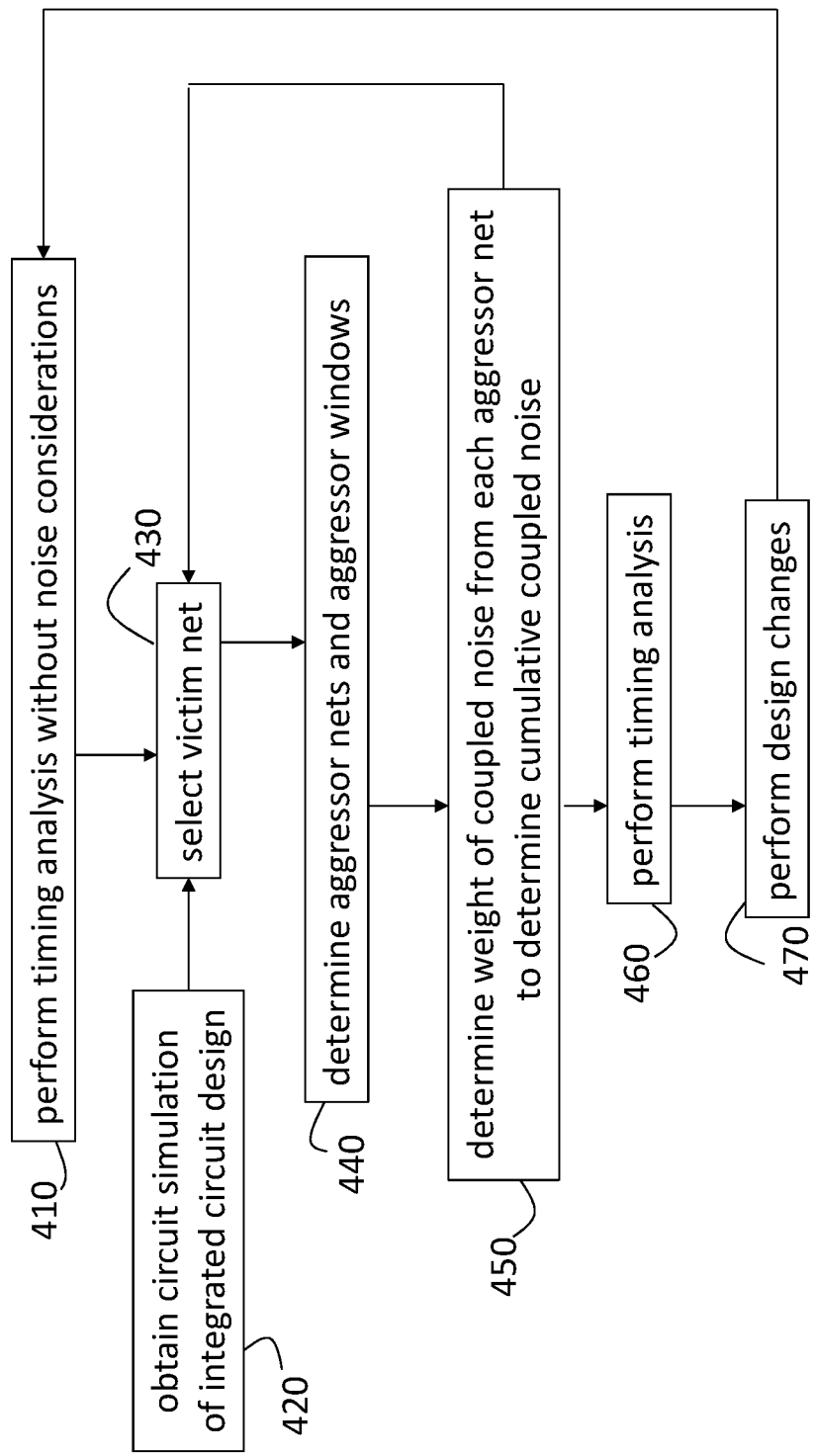
FIG. 4 is a process flow of a method of performing integrated circuit design that includes pessimism reduction in cross-talk noise determination according to embodiments of the invention.

FIG. 4 is a process flow of a method of performing integrated circuit design that includes pessimism reduction in cross-talk noise determination according to embodiments of the invention. The processes shown in FIG. 4 may be performed at different levels (e.g., on a portion of the design or the entirety of the design that is ultimately fabricated into the integrated circuit 120). At different stages, the processes of FIG. 4 may be repeated at different levels. At block 410, performing timing analysis without noise considerations refers to determining whether the design or portion of the design meets established timing requirements. The timing analysis can involve known functions such as common path pessimism removal (CPPR), for example, and is used to identify nets 220 that do not meet timing requirements. Once these failing nets 220 are identified, the design may be modified (block 470) to improve the timing results. That is, according to an exemplary embodiment, the processes at block 410 and block 470 may be performed until the timing requirements are met without considering noise before the processes that consider coupled noise are performed.

At block 420, obtaining a circuit simulation of the integrated circuit design refers to the known process of using an extractor. Specifically, the design is modeled as a physical layout represented as a circuit of resistors and capacitors. The capacitive coupling or coupled energy is not only identified but the time at which the coupled noise reaches each victim is also provided by the extractor. At block 430, one net 220 is selected as the victim net 220 for each iteration. Thus, over the iterations, each net 220 is considered both as a victim of nearby aggressor nets 220 and as an aggressor to nearby victim nets 220. At block 440, the aggressor nets 220 pertaining to the selected victim net 220 and their corresponding aggressor windows 320 are obtained from the circuit simulation provided by the extractor. The processes up to this point are similar to the conventional processing.

According to embodiments of the invention, at block 450, determining a weight of the coupled noise from each aggressor net 220 to determine cumulative coupled energy involves determining the overlap between the victim sensitive window 310 and each aggressor window 320. As previously noted, the percentage of each aggressor window 320 that overlaps with the victim sensitivity window 310 can be the weight associated with the coupled noise from the corresponding aggressor net 220. According to alternate embodiments, the percentage can be mapped to a weighting value rather than being the weight itself. Once the weight has been determined for every aggressor net 220 of the selected victim net 220, the weighted coupled noise values are added to provide the cumulative coupled noise.

At block 460, performing timing analysis includes considering the cumulative coupled noise that was determined (at block 450) for each net 220 based on selecting that net 220 as the victim net 220 for one iteration. For example, the coupled noise can increase the charging time for a node 210 at which the net 220 terminates. As a result, the delay through the net 220 is increased by the increase in charging time. This can cause the net 220 to fail the timing requirement. Performing design changes, at block 470, is a process that is executed as needed based on the result of the timing analysis at block 460. Nets 220 that fail the established timing requirement may be redesigned. For example, one or both of the nodes 210 connected by the net 220 may be moved to make the net 220 shorter. Once design changes to address failing nets 220 are completed (at block 470), the processes can be repeated, as shown in FIG. 4, until all the nets 220 pass the timing analysis at block 410 or block 460.

FIG. 5 is a process flow of a method of fabricating the integrated circuit according to exemplary embodiments of the invention. Once the physical design data is obtained, based, in part, on the pessimism reduction in cross-talk noise determination according to embodiments of the invention, the integrated circuit 120 can be fabricated according to known processes that are generally described with reference to FIG. 5. Generally, a wafer with multiple copies of the final design is fabricated and cut (i.e., diced) such that each die is one copy of the integrated circuit 120. At block 510, the processes include fabricating masks for lithography based on the finalized physical layout. At block 520, fabricating the wafer includes using the masks to perform photolithography and etching. Once the wafer is diced, testing and sorting each die is performed, at block 530, to filter out any faulty die.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are to be construed in the broadest sense, superseding any other implied definitions hereinbefore or hereinafter unless expressly asserted to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer-implemented method of performing an integrated circuit design, the method comprising:

selecting, using a processor, a net among a plurality of nets of the integrated circuit design as a victim net, wherein each net connecting a pair of nodes of the integrated circuit design and each node representing a logic element of the integrated circuit design;

determining a victim sensitivity window as a time period during which the victim net is susceptible to an influence of the coupled noise;

determining, using the processor, aggressor nets among the plurality of nets for the victim net, each aggressor net being an origin of a coupled noise that reaches the victim net;

determining a corresponding aggressor window for each of the aggressor nets as a time period during which the coupled noise originating from the aggressor net reaches the victim net determining, using the processor, a corresponding weight value for each of the aggressor nets and, for each of the aggressor nets, multiplying the coupled noise originating from the aggressor net with the corresponding weight value to obtain a weighted coupled noise value;

obtaining, using the processor, a cumulative coupled noise value for the victim net as a sum of the weighted coupled noise values associated with each of the aggressor nets; and providing a result of the integrated circuit design for fabrication into an integrated circuit, wherein the determining the corresponding weight value for each of the aggressor nets includes determining a percentage of the corresponding aggressor window for each of the aggressor nets that overlaps with the victim sensitivity window, and the corresponding weight value for each of the aggressor nets is the percentage of the corresponding aggressor window that overlaps with the victim sensitivity window.

2. The method according to claim 1, further comprising determining the coupled noise associated with each of the aggressor nets based on obtaining a circuit simulation of the integrated circuit design, wherein the determining the victim sensitivity window and the determining the corresponding aggressor window for each of the aggressor nets is also based on the circuit simulation.

3. The method according to claim 1, wherein the selecting the net as the victim net and the obtaining the cumulative coupled noise value for the victim net is performed iteratively for a different one of the plurality of nets.

4. The method according to claim 3, further comprising performing timing analysis on the integrated circuit design that includes the cumulative coupled noise associated with each of the plurality of nets.

5. A system to perform integrated circuit design, the system comprising:
a memory device configured to store the integrated circuit design including a plurality of nets interconnecting a plurality of nodes, wherein each net connects a pair of the plurality of nodes and each node representing a logic element; and
a processor configured to select a net among the plurality of nets as a victim net, to determine a victim sensitivity window as a time period during which the victim net is susceptible to an influence of the coupled noise, to determine aggressor nets among the plurality of nets for the victim net, each aggressor net being an origin of a coupled noise that reaches the victim net, to determine a corresponding aggressor window for each of the aggressor nets as a time period during which the coupled noise originating from the aggressor net reaches the victim net, to determine a corresponding weight value associated with each of the aggressor nets, to multiply the coupled noise originating from each of the aggressor nets with the corresponding weight value to obtain a weighted coupled noise value, and to obtain a cumulative coupled noise value for the victim net as a sum of the weighted coupled noise value associated with each of the aggressor nets, wherein a result of the integrated circuit design is provided for fabrication into an integrated circuit, wherein the processor determines the corresponding weight value for each of the aggressor nets based on determining a percentage of the corresponding aggressor window for each of the aggressor nets that overlaps with the victim sensitivity window, and the corresponding weight value for each of the aggressor nets is the percentage of the corresponding aggressor window that overlaps with the victim sensitivity window.

6. The system according to claim 5, wherein the processor is further configured to obtain a circuit simulation of the integrated circuit design and determine the coupled noise associated with each of the aggressor nets, the victim sensitivity window, and the corresponding aggressor window for each of the aggressor nets based on the circuit simulation.

7. The system according to claim 5, wherein the processor is further configured to iteratively select a different one of the plurality of nets as the victim net and obtain the cumulative coupled noise value for the victim net.

8. The system according to claim 7, wherein the processor is further configured to perform timing analysis on the integrated circuit design that includes the cumulative coupled noise associated with each of the plurality of nets.

9. A computer program product for performing integrated circuit design, the computer program product comprising a computer readable storage medium having program instructions embodied therewith, the program instructions executable by a processor to perform a method comprising:

selecting a net among a plurality of nets of the integrated circuit design as a victim net, wherein each net connecting a pair of nodes of the integrated circuit design and each node representing a logic element of the integrated circuit design;

determining a victim sensitivity window as a time period during which the victim net is susceptible to an influence of the coupled noise;

determining aggressor nets among the plurality of nets for the victim net, each aggressor net being an origin of a coupled noise that reaches the victim net;

determining a corresponding aggressor window for each of the aggressor nets as a time period during which the coupled noise originating from the aggressor net reaches the victim net;

determining a corresponding weight value for each of the aggressor nets and, for each of the aggressor nets, multiplying the coupled noise originating from the aggressor net with the corresponding weight value to obtain a weighted coupled noise value;

obtaining a cumulative coupled noise value for the victim net as a sum of the weighted coupled noise values associated with each of the aggressor nets, wherein a result of the integrated circuit design is provided for fabrication into an integrated circuit, wherein the determining the corresponding weight value for each of the aggressor nets includes determining a percentage of the corresponding aggressor window for each of the aggressor nets that overlaps with the victim sensitivity window as the corresponding weight value.

10. The computer program product according to claim 9, further comprising determining the coupled noise associated with each of the aggressor nets based on obtaining a circuit simulation of the integrated circuit design, wherein the determining the victim sensitivity window and the determining the corresponding aggressor window for each of the aggressor nets is also based on the circuit simulation.

11. The computer program product according to claim 9, wherein the selecting the net as the victim net and the obtaining the cumulative coupled noise value for the victim net is performed iteratively for a different one of the plurality of nets.

12. The computer program product according to claim 11, further comprising performing timing analysis on the integrated circuit design that includes the cumulative coupled noise associated with each of the plurality of nets.

* * * * *